United States Patent
Momiyama

4,213,674
Jul. 22, 1980

[54] TESSAR FORM PHOTOGRAPHIC LENS

[75] Inventor: Kikuo Momiyama, Yokohama, Japan

[73] Assignee: Canon Kabushiki Kaisha, Tokyo, Japan

[21] Appl. No.: 952,401

[22] Filed: Oct. 18, 1978

[30] Foreign Application Priority Data

Oct. 20, 1977 [JP] Japan .................... 52-126332

[51] Int. Cl.² ............................................. G02B 9/20
[52] U.S. Cl. ................................................. 350/227
[58] Field of Search ...................................... 350/227

[56] References Cited

U.S. PATENT DOCUMENTS

| | | | |
|---|---|---|---|
| 3,864,028 | 2/1975 | Paukert | 350/227 |
| 3,876,292 | 4/1975 | Velesik | 350/227 |
| 3,895,857 | 7/1975 | Imai | 350/227 |

FOREIGN PATENT DOCUMENTS 954585  4/1964  United Kingdom .................... 350/227

*Primary Examiner*—Conrad J. Clark
*Attorney, Agent, or Firm*—Toren, McGeady and Stanger

[57] ABSTRACT

The present invention relates to a Tessar form photographic lens consisting of four lenses in three components. The first component consists of a positive meniscus lens having a convex surface at the object side, the second component consists of a bi-concave lens, the third component consists of a positive lens composed of a negative lens and a positive lens cemented on each other. A diaphragm is arranged in front of the image facing surface of the third component. The diameter of the first component is larger than those of the second and the third component, while the second component is in edge contact with the third component.

6 Claims, 6 Drawing Figures

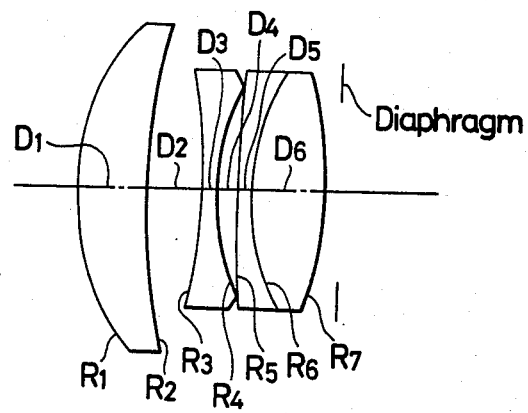
FIG.1
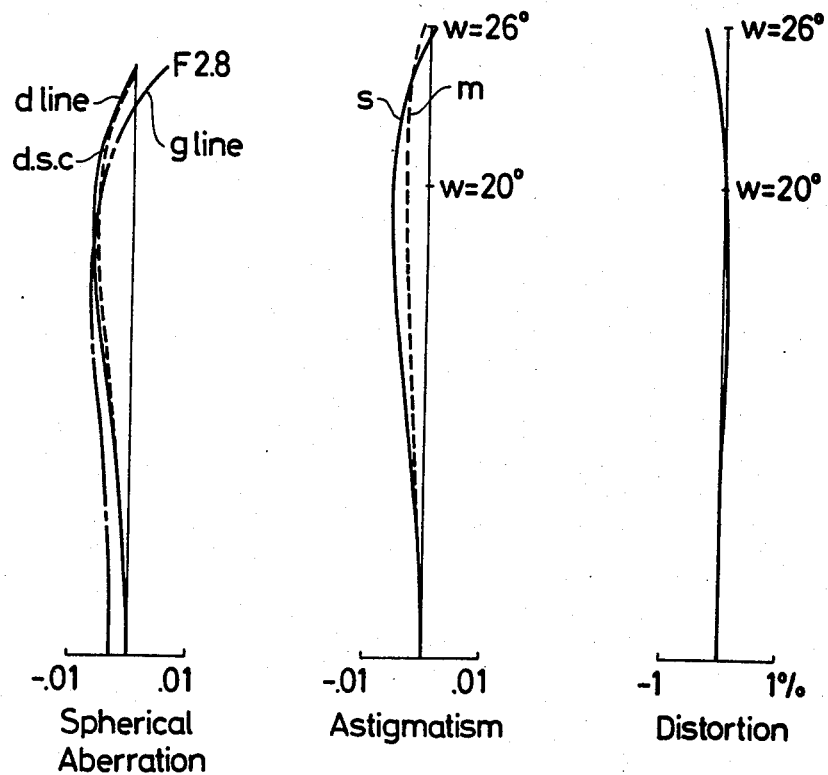
FIG.2
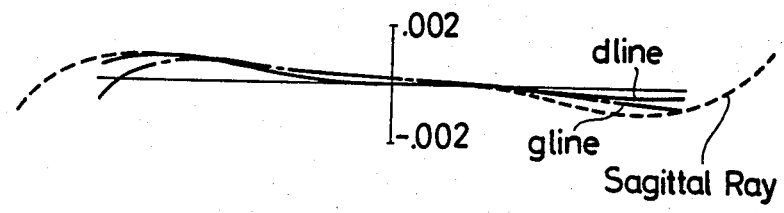
Transverse Aberration (w=20°)

TESSAR FORM PHOTOGRAPHIC LENS

BACKGROUND OF THE INVENTION

The present invention relates to a behind-stop type photographic lens, particularly a Tessar form of lens.

In a conventional photographic lens, the diaphragm is arranged in the space within the lens system. In some cases, it is requested to provide the diaphragm out of the lens system. For example, use of a rear-diaphragm lens in a lens shutter type camera makes it possible to focus the lens without moving the shutter and the diaphragm, or the shutter serving as diaphragm. This results in a simple mechanism, and for that reason, rear-diaphragm lenses are often in demand.

However, with a diaphragm behind the lens, the more compact the lens, the more difficult is the compensation of its aberration. An example of a compact rear-diaphragm type Tessar form lens is disclosed in the U.S. Pat. No. 3,953,112.

SUMMARY OF THE INVENTION

A first purpose of the present invention is to provide a compact lens.

A second purpose of the present invention is to correct aberrations in the lens.

According to an aspect of the present invention, a Tessar photographic lens consists of four lenses in three components, in which the first component consists of a positive meniscus lens having a convex surface at the object end, the second component consists of a bi-concave lens, the third component consists of a positive lens composed of a negative lens and a positive lens cemented to each other, a diaphragm is arranged behind the third group and the following relations prevail;

(1) $1.1f < TL < 1.25f$
(2) $0.35f < TD < 0.40f$
(3) $0 < Da - Db < 0.07f$
(4) $0.06f < D_2 < 0.1f$
(5) $0.025f < D_4 < 0.04f$
(6) $0.36f < R_1 < 0.4f$
(7) $0.33f < R_4 < 0.38f$
(8) $0.34f < R_6 < 0.4f$ and further
(9) $0.23 < N_4 - N_3$
(10) $0.13 < (N_1 + N_4)/2 - (N_2 + N_3)/2$
(11) $45 < V_1$
(12) $26. < V_2 < 30.$ wherein
TL is the distance between the first lens surface and the image plane along the optical axis
TD is the total lens length
Da is the distance between the first and the third surface
Db is the distance between the fourth and the seventh surface
Ri is the radius of curvature of the surface
Di is the distance between the surfaces
Ni is the refractive index of the i-th lens medius
Vi is the Abbe number of the i-th lens medius.

BRIEF DESCRIPTION OF THE DRAWINGS

FIG. 1 shows a lens corresponding to the first embodiment of the present invention in section.

FIG. 2 shows various aberrations of the lens in FIG. 1.

DESCRIPTION OF THE PREFERRED EMBODIMENTS

Figure 3:
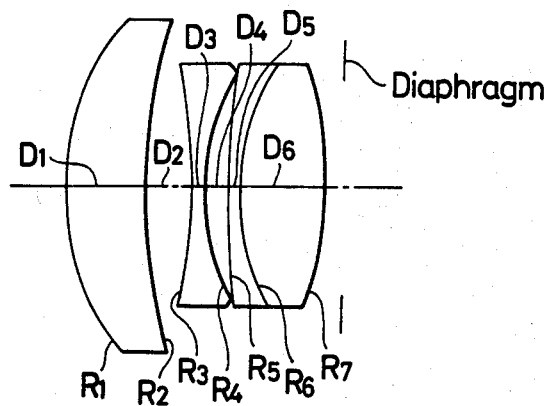
FIG. 3 shows a lens corresponding to the second embodiment of the present invention in section.

FIGS. 1 and 3 illustrate lenses having the aforementioned relationships (1) to (2). Of these relations, the first relation (1) is established in view of the shortening of the total lens length and the correction of the aberrations. The upper limit is the criterion for the shortening. When the lens is made compact beyond the lower limit in the relation, $1.1f < TL < 1.25f$, the aberrations may not be properly corrected even if the following relations are satisfied. In order that the distance from the first surface of the lens to the image plane be within the above range, it is necessary that the total lens length and the back focus should be made short. However when the total lens length is too short, the spherical aberration, the image distortion and the sagital halo are so large that the compensation for aberration becomes difficult. The second relation (2) defines the range of the total lens length in which the aberrations can be successfully compensated while the distance from the first surface to the film surface is below 1.25f.

When the upper limit in the relation $0.35f < TD < 0.40f$ is surpassed, the total lens length can not be made compact, while the diameter of the first lens becomes quite large.

On the other hand, if the lower limit is surpassed, the compensation of the aberrations becomes difficult. When the total lens length is within the range of the relation (2), it is necessary to make the back focus of the lens short, compared with that of the conventional lens in order to realize a compact lens. A feature of the present invention different from that of conventional lens of this kind is that the distance (Da) from the first surface to the third surface is larger than the distance (Db) from the fourth surface to the seventh surface in order to obtain a short back focus within the range of the relation (3). In accordance with this relation, the short back focus can be obtained without increasing the refractive ratio of the first component, while the spherical aberration can be suitably compensated. Beyond the lower limit in $0 < Da - Db < 0.07f$ the back focus can not be shortened sufficiently, while beyond the upper limit asymmetricity of the lens system becomes large. Then the paraxial aberration becomes especially difficult to compensate.

In accordance with the present invention in order to realize easy lens holding the air distance between the first component and the second component is chosen sufficiently large to keep the space for the metal barrel, while the air distance between the second component and the third component is chosen small enough to be able to bring the second component and the third component in edge contact with each other along the lens circumference.

In consequence, it is desirable to use the range of the relations (4) and (5) for $D_2$ and $D_4$, taking the above mentioned lens holding and the compensation of the aberration into consideration.

Beyond the lower limit in $0.06 < D_2 < 0.1$ the lens holding becomes difficult, while beyond the upper limit the coma can not be compensated sufficiently and the the same time, the diameter of the first component becomes undesirably large. Beyond the upper limit of $0.025f < D_4 < 0.04f$ the distortion can not be compensated sufficiently and it becomes difficult to bring the second and the third components into edge contact. Beyond the lower limit the coma can not be compensated sufficiently. This is undesirable.

When the lens is basically formed as mentioned, it is necessary to satisfy the relations (6) and (7) with reference to the radius of curvature of $R_1$ and $R_4$ principally for the compensation of the spherical aberration. Values $R_1$ and $R_4$ are respectively a severe radius of curvature. However, in accordance with the present invention the spherical aberration is well compensated with less severe radius of curvatures than those of the conventional lens of this kind. Beyond the lower limit of $036f < R_1 < 0.4f$ and that of $0.33f < R_4 < 0.38f$ the spherical aberration can well be compensated, while beyond the upper limit the Petzval sum becomes large whereby the distortion becomes large, which is not desirable. The lenses cemented on each other in the third component are effective for the improvement of the Petzval sum, whereby when the radius of curvature of the cemented lens surfaces is large the spherical aberration has a tendency to become large.

In accordance with the present invention, the difference between the refractive index of the third lens and that of the fourth lens is made as large as possible as in the relations (8) and (9). The radius of curvature of $R_6$ is made loose so as to improve the Petzval sum without deteriorating the spherical aberration. Beyond the lower limit of $0.34f < R_6 < 0.40f$ the spherical aberration is worse, while the upper limit the Petzval sum becomes large. Further, in case the relation $0.22 < N_4 - N_3$ is not satisfied, the Petzval sum becomes large. This is not desirable.

Relation (10) attempts to improve the Petzval sum. Namely, the refractive index of the glass for the positive lens is chosen substantially higher than that of the glass for the negative lens.

The relations (11) and (12) are intended for the efficient improvement of the chromatic aberration. The distance between the first component and the second component has been made large in accordance with the above mentioned relations (3) and (4) in such a manner that the chromatic aberration has a tendency to be overcompensated so that it is necessary to choose a large V value of the first component large and a small V value of the second component. In case the relation $45 < V_1$ is not satisfied, it is difficult to compensate the chromatic aberration while the chromatic coma aberration becomes large, which is not desirable. Further, beyond the upper limit of the relation $26 < V_2 < 30$. the compensation of the chromatic aberration is difficult, while beyond the lower limit the chromatic spherical aberration becomes large, which is not desirable.

Figure 4:
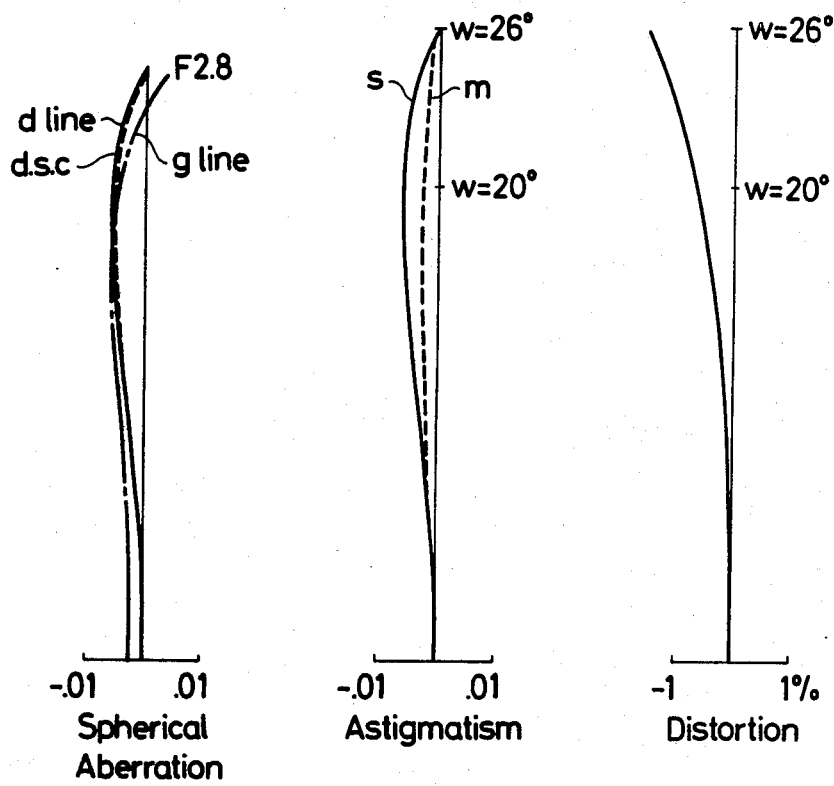
FIG. 4 shows various aberrations of the above lens.
Figure 4:
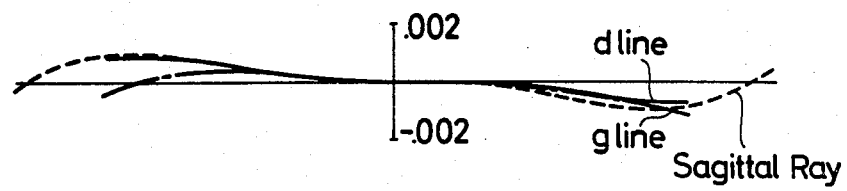
Figure 5:
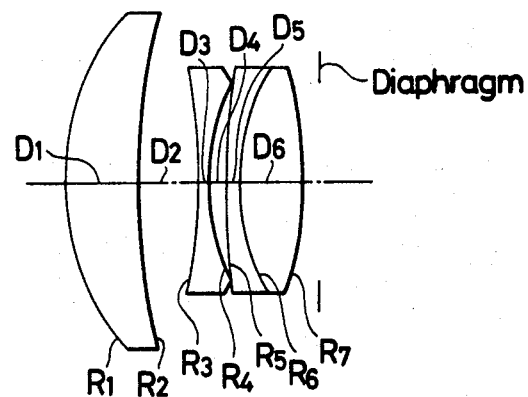
FIG. 5 shows a lens corresponding to the third embodiment of the present invention in section.
Figure 6:
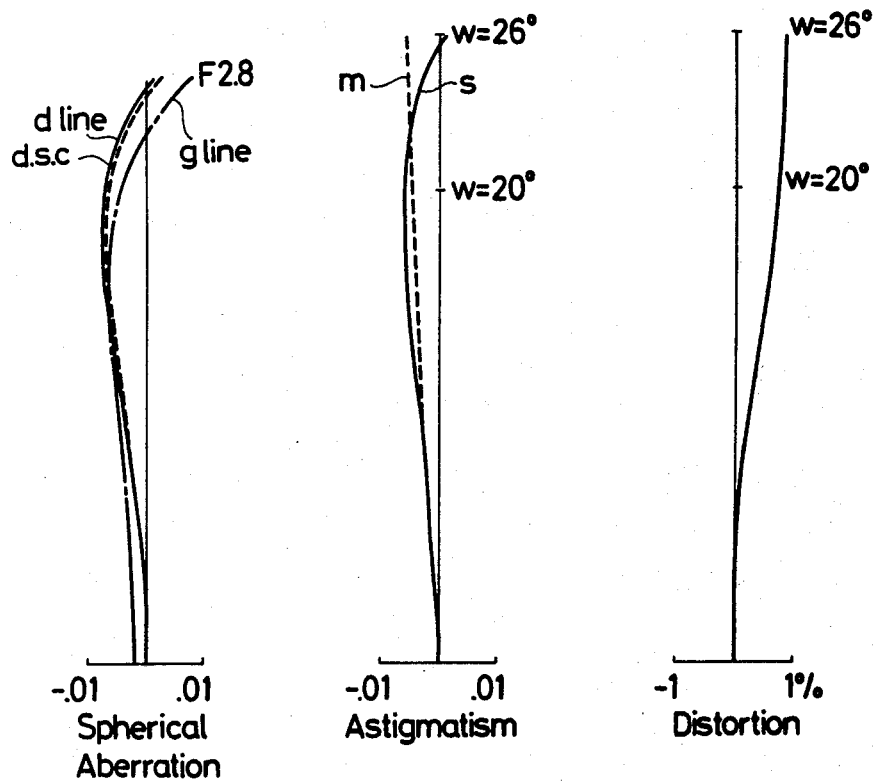
Figure 6:
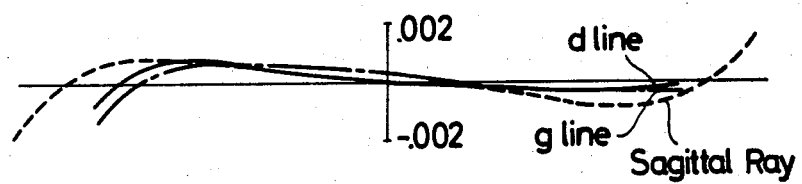

FIG. 1 shows the lens of the first embodiment in section, while FIG. 2 shows the spherical aberration, the astigmatism, the distortion and the crosswise aberration at the half picture angle of the above lens. FIG. 3 shows the lens of the second embodiment in section, while FIG. 4 shows the various aberration of the above lens. FIG. 5 shows the lens of the third embodiment, in section, while FIG. 6 shows the various aberration of the above lens.

Embodiment 1

$f = 1 \quad F No. = 2.8 \quad 2\omega = 52°$

| R | D | N | V |
|---|---|---|---|
| $R_1 = 0.37900$ | $D_1 = 0.10760$ | $N_1 = 1.77250$ | $V_1 = 49.6$ |
| $R_2 = 0.98440$ | $D_2 = 0.07974$ | | |
| $R_3 = -1.02330$ | $D_3 = 0.02239$ | $N_2 \; 1.72825$ | $V_2 = 28.5$ |
| $R_4 = 0.34765$ | $D_4 = 0.03144$ | | |
| $R_5 = 1.77096$ | $D_5 = 0.02239$ | $N_3 = 1.50137$ | $V_3 = 56.4$ |
| $R_6 = 0.37510$ | $D_6 = 0.11261$ | $N_4 = 1.78590$ | $V_4 = 44.2$ |
| $R_7 = -0.64400$ | | | |

$\Sigma D = 0.37617 \quad\quad b.f. = 0.78886$
$TL = 1.165$

| | Aberrations | | | |
|---|---|---|---|---|
| I | II | III | P | V |
| 4.5171 | −0.2423 | 0.0130 | 1.1499 | −0.0624 |
| 0.1304 | −0.3705 | 1.0530 | −0.4427 | −1.7343 |
| −3.6722 | 3.1728 | −2.7414 | −0.4117 | 2.7245 |
| −7.0247 | −1.5597 | −0.3463 | −1.2121 | −0.3460 |
| 0.6299 | 0.5490 | 0.4785 | 0.1885 | 0.5815 |
| 2.8776 | 0.5557 | 0.1073 | 0.2829 | 0.0753 |
| 3.8597 | −2.3714 | 1.4570 | 0.6833 | −1.3150 |
| Σ 1.3179 | −0.2664 | 0.0213 | 0.2381 | −0.0764 |

I : Spherical aberration
II : Coma
III : Astigmatism
P : Petzval sum
V : Distorsion

Embodiment 2

$f = 1, \quad F No. = 2.8 \quad 2\omega = 52°$

| R | D | N | V |
|---|---|---|---|
| $R_1 = 0.39195$ | $D_1 = 0.12026$ | $N_1 = 1.788$ | $V_1 = 47.4$ |
| $R_2 = 0.90180$ | $D_2 = 0.06681$ | | |
| $R_3 = -0.98315$ | $D_3 = 0.02227$ | $N_2 = 1.71736$ | $V_2 = 29.5$ |
| $R_4 = 0.36465$ | $D_4 = 0.03563$ | | |
| $R_5 = 1.37379$ | $D_5 = 0.02227$ | $N_3 = 1.54041$ | $V_3 = 51$ |
| $R_6 = 0.38749$ | $D_6 = 0.12471$ | $N_4 = 1.788$ | $V_4 = 47.4$ |
| $R_7 = -0.63691$ | | | |

$\Sigma D = 0.39195 \quad\quad b.f. = 0.80937$
$TL = 1.2013$

| | Aberrations | | | |
|---|---|---|---|---|
| I | II | III | P | V |
| 4.0935 | −0.1423 | 0.0049 | 1.1244 | −0.0392 |
| 0.0473 | −0.2017 | 0.8588 | −0.4887 | −1.5757 |
| −3.3531 | 2.9337 | −2.5667 | −0.4248 | 2.6174 |
| −7.1685 | −1.5080 | −0.3172 | −1.1455 | −0.3077 |
| 0.9913 | 0.7027 | 0.4982 | 0.2553 | 0.5342 |
| 2.4625 | 0.4484 | 0.0816 | 0.2319 | 0.0571 |
| 4.1752 | −2.4478 | 1.4351 | 0.6919 | −1.2471 |
| Σ 1.2483 | −0.2150 | −0.0051 | 0.2446 | 0.0389 |

Embodiment 3

$f = 1, \quad F No. = 2.8 \quad 2\omega = 52°$

| R | D | N | V |
|---|---|---|---|
| $R_1 = = 0.36697$ | $D_1 = 0.11188$ | $N_1 = 1.72916$ | $V_1 = 54.7$ |
| $R_2 = 1.00072$ | $D_2 = 0.08950$ | | |
| $R_3 = 0.86680$ | $D_3 = 0.01790$ | $N_2 = 1.74077$ | $V_2 = 27.8$ |
| $R_4 = 0.34416$ | $D_4 = 0.02685$ | | |
| $R_5 = 1.69121$ | $D_5 = 0.01790$ | $N_3 = 1.51118$ | $V_3 = 51.$ |
| $R_6 = 0.35354$ | $D_6 = 0.09398$ | $N_4 = 1.8061$ | $V_4 = 40.9$ |
| $R_7 = -0.61841$ | | | |

$\Sigma D = 0.35801 \quad\quad b.f. = 0.77532$
$TL = 1.1333$

| | Aberrations | | | |
|---|---|---|---|---|
| I | II | III | P | V |
| 4.9351 | −0.3085 | 0.0192 | 1.1491 | −0.0730 |
| 0.1387 | −0.3800 | 1.0414 | −0.4213 | −1.6989 |
| −4.1247 | 3.3791 | −2.7683 | −0.4909 | 2.6700 |
| −7.7550 | −1.8733 | −0.4525 | −1.2364 | −0.4079 |
| 0.8306 | 0.6798 | 0.5565 | 0.2000 | 0.6192 |
| 3.4705 | 0.6675 | 0.1283 | 0.3056 | 0.0834 |
| 3.9508 | −2.4438 | 1.5116 | 0.7217 | −1.3815 |

-continued

Embodiment 3

| Σ | 1.4461 | −0.2793 | 0.0365 | 0.2277 | −0.1887 |

What is claimed is:

1. A Tessar form of photographic lens comprising, from the object end, a first component having a positive meniscus lens having a convex surface facing the object end, a second component having a bi-concave lens, a third component having a doublet lens consisting, in sequence, of a negative lens and a bi-convex lens cemented to each other and a diaphragm arranged at the back of the image facing surface of the third component, wherein the relations (1) $1.1f < TL < 1.25f$
(2) $0.35f < TD < 0.40f$
(3) $0 < Da - Db < 0.07f$
(4) $0.06f < D_2 < 0.1f$
(5) $0.025f < D_4 < 0.04f$
(6) $0.36f < R_1 < 0.4f$
(7) $0.33f < R_4 < 0.38f$
(8) $0.34f < R_6 < 0.4f$ are satisfied, and wherein TL is the distance between the first lens surface of the lens (set at the infinite distance) and the image plane along the optical axis
TD is the total lens thickness along the optical axis
Da is the distance between the first and the third lens surface
Db is the distance between the fourth and the seventh lens surface
$D_2$ is the distance between the first and the second lens surface
$D_4$ is the distance between the fourth and the fifth lens surface, and
$R_1$, $R_4$, $R_6$ are the respective radii of curvature of the first, the fourth and the sixth lens surface.

2. A lens in accordance with claim 1, wherein the relations (a) $0.23 < N_4 - N_3$
(b) $0.13 < (N_1 + N_4)/2 - (N_2 + N_3)/2$
(c) $45 < V_1$
(d) $26. < V_2 < 30.$ are satisfied, whereby $N_1$, $N_2$, $N_3$ and $N_4$ are each the respective refractive index of the medium for the positive meniscus lens, the bi-concave lens, the negative lens of the doublet lens and the bi-convex lens of the doublet lens, and
$V_1$ and $V_2$ are each the respective Abbe number of the medium for the positive meniscus lens and the bi-concave lens.

3. A lens in accordance with claim 1, wherein the diameter of the positive meniscus lens is larger than that of the bi-concave lens, the bi-concave lens in edge contact with the doublet lens and the positive meniscus lens is separated from the bi-concave lens.

4. A lens in accordance with claim 1, wherein $f=1$, F No.$=2.8$ Picture angle $2\omega=52°$

| R | D | N | V |
|---|---|---|---|
| $R_1 = 0.37900$ | $D_1 = 0.10760$ | $N_1 = 1.77250$ | $V_1 = 49.6$ |
| $R_2 = 0.98440$ | $D_2 = 0.07974$ | | |
| $R_3 = -1.02330$ | $D_3 = 0.02239$ | $N_2 = 1.72825$ | $V_2 = 28.5$ |
| $R_4 = 0.34765$ | $D_4 = 0.03144$ | | |
| $R_5 = 1.77096$ | $D_5 = 0.02239$ | $N_3 = 1.50137$ | $V_3 = 56.4$ |
| $R_6 = 0.37510$ | $D_6 = 0.11261$ | $N_4 = 1.78590$ | $V_4 = 44.2$ |
| $R_7 = -0.64400$ | | | | whereby

R is the radius of curvature of lens
D is the lens thickness or distance between surfaces
N is the refractive index
V is the Abbe number.

5. A lens in accordance with claim 1, wherein $f=1$, F No.$=2.8$ Picture angle $2\omega=52°$

| R | D | N | V |
|---|---|---|---|
| $R_1 = 0.39195$ | $D_1 = 0.12026$ | $N_1 = 1.788$ | $V_1 = 47.4$ |
| $R_2 = 0.90180$ | $D_2 = 0.06681$ | | |
| $R_3 = -0.98315$ | $D_3 = 0.02227$ | $N_2 = 1.71736$ | $V_2 = 29.5$ |
| $R_4 = 0.36465$ | $D_4 = 0.03563$ | | |
| $R_5 = 1.37379$ | $D_5 = 0.02227$ | $N_3 = 1.54041$ | $V_3 = 51.$ |
| $R_6 = 0.38749$ | $D_6 = 0.12471$ | $N_4 = 1.788$ | $V_4 = 47.4$ |
| $R_7 = -0.63691$ | | | | whereby

R is the radius of curvature of lens
D is the lens thickness or distance between surfaces
N is the refractive index
V is the Abbe number.

6. A lens in accordance with claim 1, wherein—$f=1$, F No.$=2.8$ Picture angle $2\omega=52°$

| R | D | N | V |
|---|---|---|---|
| $R_1 = 0.36697$ | $D^1 = 0.11188$ | $N^1 = 1.72916$ | $V^1 = 54.7$ |
| $R_2 = 1.00072$ | $D^2 = 0.08950$ | | |
| $R_3 = -0.86680$ | $D^3 = 0.01790$ | $N^2 = 1.74077$ | $V^2 = 27.8$ |
| $R_4 = 0.34416$ | $D^4 = 0.02685$ | | |
| $R_5 = 1.69121$ | $D^5 = 0.01790$ | $N^3 = 1.51118$ | $V^3 = 51.$ |
| $R_6 = 0.35354$ | $D^6 = 0.09398$ | $N^4 = 1.8061$ | $V^4 = 40.9$ |
| $R_7 = -0.61841$ | | | | whereby

R is the radius of curvature of lens
D is the lens thickness or distance between sufaces
N is the refractive index
V is the Abbe number.

* * * * *